United States Patent
Fritzinger et al.

(10) Patent No.: US 6,956,936 B2
(45) Date of Patent: Oct. 18, 2005

(54) VIRTUAL TELEPHONE

(75) Inventors: Robert Fritzinger, Williamsville, NY (US); Ronald D. Olsen, Lake View, NY (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 09/817,581

(22) Filed: Mar. 26, 2001

(65) Prior Publication Data

US 2001/0016037 A1 Aug. 23, 2001

Related U.S. Application Data

(63) Continuation of application No. 09/057,681, filed on Apr. 9, 1998, now Pat. No. 6,208,724.

(51) Int. Cl.[7] ............................................. H04M 3/42
(52) U.S. Cl. ............................. 379/201.01; 379/142.14
(58) Field of Search ........................ 379/201.01, 201.03, 379/201.12, 207.02, 219, 220.01, 220.02, 242, 243, 230, 229

(56) References Cited

U.S. PATENT DOCUMENTS

| 5,404,396 | A | * | 4/1995 | Brennan | 379/201 |
|---|---|---|---|---|---|
| 5,642,410 | A | * | 6/1997 | Walsh et al. | 379/201 |
| 5,799,076 | A | * | 8/1998 | Sitters et al. | 379/229 |
| 6,014,440 | A | * | 1/2000 | Melkild et al. | 379/269 |
| 6,208,724 | B1 | * | 3/2001 | Fritzinger et al. | 379/201 |
| 6,304,650 | B1 | * | 10/2001 | Takeshita | 379/219 |

* cited by examiner

Primary Examiner—William J. Deane, Jr.
(74) Attorney, Agent, or Firm—Alan Pedersen-Giles

(57) ABSTRACT

A telephone communication system utilizing a virtual phone wherein a telephone switch or similar digital switching device, a digital telephone and an external device such as a personal computer (PC) or other processor are generically interfaced. The virtual phone generic interface is configurable and comprises a set of virtual phone data structures, internal and external virtual phone application program interfaces, and an external transfer protocol. Software designated an abstraction layer provides communication between the internal virtual phone application program interface, the telephone switch and the telephone set. The generic interface converts proprietary telephone switch or external interface application protocols into a common format and functions as a protocol interpreter between proprietary switching system protocols and protocols of various applications.

26 Claims, 4 Drawing Sheets

VIRTUAL TELEPHONE

This application is a continuation of U.S. Ser. No. 09/057,681 filed Apr. 9, 1998, now U.S. Pat. No. 6,208,724.

BACKGROUND OF THE INVENTION

1. Field of the Invention

The present invention relates generally to a telephone communication system and, in particular, to a device that provides a generic software interface to a digital line on one of many different types of digital phone switches. A telephone with such a generic interface is a "virtual phone" that has the flexibility to represent the majority of features of any digital phone, regardless of the switch type or the number of features in a digital phone.

The general concept of a virtual telephone has been in existence in various forms across different product lines. In some cases a virtual phone has been used to represent a specific digital phone, such as Rolm Phone 400 or a Meridian 2616. Those phones represent a superset of phones for their respective switches. In other cases a virtual phone has been used to represent only the necessary portions, or a subset, or a digital telephone.

2. Prior Art

One of the important characteristics of a telecommunication system is the ability of different interconnected components of the system to effectively communicate with each other. Many business-oriented telecommunication systems have PBX (Private Branch Exchange) switches that link internal telephones with each other and with external telephone networks.

Even though today most vendors build the PBXs around common available processors running common operating systems (such as UNIX) and use common programming languages (such as C or C++), unfortunately different vendors' switching devices use proprietary communication protocols. Thus, it is virtually impossible to integrate one vendor's switching device with other vendors' applications.

Therefore, it becomes highly desirable to provide a telecommunication system with a feature that would convert proprietary PBX or external application protocols into a common format, and thus would function as a "protocol interpreter" between proprietary switching system protocols and the protocols of various applications.

A number of solutions to that problem have been disclosed in the prior art. For example, U.S. Pat. No. 4,873,718 "Feature Telephone Integration Device" issued to Barnett et al discloses a device and method for integrating one vendor's application (a voice mail system) into a PBX environment of a different vendor. In that patent the interconnection was achieved by equipping the PBX vendor's feature phone with additional circuitry to monitor telephone communication between the PBX, the feature telephone and the external application. An obvious disadvantage of the disclosed system is its inability to provide a generic interface between many possible proprietary protocols of different PBX switching systems and an external application. The disclosed invention provided integration only between a PBX and a voice mail system, it did not provide for the possibility to integrate a PBX with a variety of different external applications. Moreover, any exchange of information about a call or a change of the status of the call occurs "one-way" only: from the PBX to the telephone set.

U.S. Pat. No. 5,440,616 provides an improvement over the device of U.S. Pat. No. 4,873,718 in the form of apparatus for interconnecting a messaging system (voice, facsimile, etc.) with a PBX which offers entirely digital transmission and provides high bandwidth and redundant transmission of control information between the messaging system and the PBX. The apparatus of U.S. Pat. No. 5,440,616 includes a digital voice terminal adapter which is a combination of hardware and software which emulates a digital feature phone and which interconnects a messaging system and a PBX to provide full integration of the messaging system with the PBX. The disclosed adapter does not, however, convert proprietary/PBX or external application protocols into a common format and thus does not function as a protocol interpreter between proprietary switching system protocols and the protocols of various applications.

U.S. Pat. No. 5,255,314 "Switch Adjunct Integration Device" issued to Applegate et al discloses a device that uses multiple line appearances of one or more digital telephone lines to gather information on calls designed for an adjunct voice mail system. After receiving the required information the device transfers the calls to analog phone lines leading to the voice mail system. That device, again, provides no more than a communication tool between a PBX switch and a voice mail system. The disclosed device does not integrate any type of the known PBX switches with any type of external device via a generic interface.

SUMMARY OF THE INVENTION

Advantageously, the present invention overcomes the "protocol conversion" difficulties which existed in the prior art. The virtual phone generic interface of the present invention comprises three distinct modules: a virtual phone data structure, a program interface, and a host interface. All three modules can work independently of a specific type of integration. The data structure and the program interface software of the virtual phone are built into the embedded processor that controls the Private Branch Exchange (PBX) digital phone switching system interface integration. The interface between the switch and the virtual phone data structure is different for each integration, but once the interface is completed, it can be reused for many different types of applications. The interface between the virtual phone structures and the external application is the same regardless of the type of integration.

The implementation of the virtual phone provides for an external interface through any type of transport medium. A phone application residing on an auxiliary PC can show the current status of the virtual phone, and can also do call control. This illustrates the common external interface and also provides a method for diagnostics. The interface to the auxiliary PC is accomplished in different ways based on the system configuration. It can be done via a serial port, ISA bus, PCI bus, universal serial bus, Ethernet, or any other type of transport configurable. An internally designed protocol is used to communicate between the virtual phone and the auxiliary PC. In essence, the virtual phone acts as a protocol converter between the proprietary switch messages and the external serial interface.

The virtual phone of the present invention provides a common interface between any of the digital phone switches and any number of end devices. The virtual phone represents the current state of some theoretical phone and has buttons, lights, a hook switch, display, ringer, and anything else typical of a standard digital phone. The main component of the virtual phone is a set of structures that represent the state of the phone at any given time. The virtual phone structures can be accessed via a set of Virtual Phone Application Program Interface (VPAPI) function calls. The virtual phone status and events are transmitted externally via a custom virtual phone host interface.

When a packet is received from a switch, an abstraction layer parses the data and calls an internal VPAPI function. The internal VPAPI function is responsible for updating the virtual phone structure and passing the information about any state changes to an auxiliary PC through the virtual phone host interface. An internally designed protocol is used to provide communication between the virtual phone and the auxiliary PC through the host interface such as a standard RS232 communications port. A phone application residing on the auxiliary PC can show the current status of the virtual phone and accomplish call control tasks. So, in essence, the virtual phone functions as a "protocol interpreter" between the proprietary switch messages and the external interface.

When an event is received from the auxiliary PC, an external VPAPI function is called to update the virtual phone. The event is passed to an abstraction layer where it is converted to a command format in accordance with a specific virtual phone integration. The command is then subsequently passed to the switch.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE PREFERRED EMBODIMENT

Telephone Communication System

Figure 1:
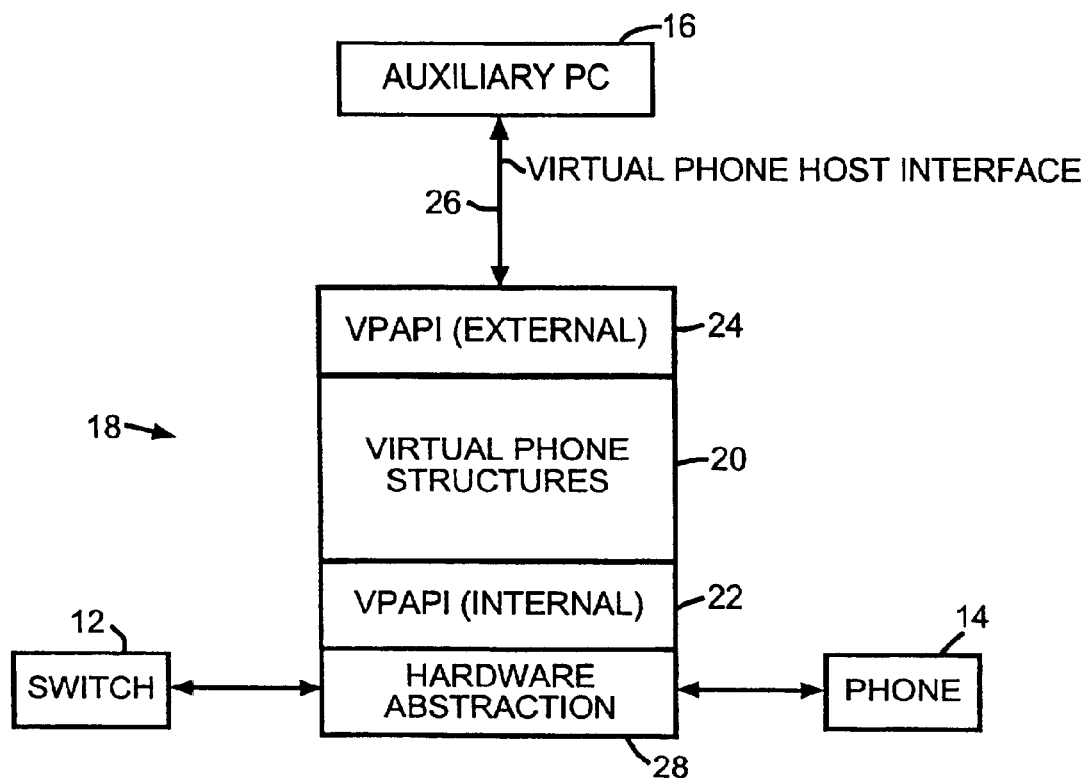
FIG. 1 is a block diagram of the telephone communication system of the present invention.

A telephone communication system utilizing the virtual phone of the present invention is shown in FIG. 1 wherein a PBX or similar digital switching device 12, a digital telephone 14 and an external device such as a personal computer (PC) or other processor 16 are interfaced by the arrangement 18 of the present invention. The virtual phone generic interface 18 of the present invention comprises a set 20 of virtual phone data structures, internal and external virtual phone application program interfaces 22 and 24, respectively, and a virtual phone host interface 26. Software designated hardware abstraction layer 28 provides communication between the internal virtual phone application program interface 22, PBX 12 and the telephone set 14.

Switch 12 can be a PBX, KSU, service provided by a central office (such as Centrex or ISDN) and does not even have to digital. Digital telephone 14 is representative of other communication devices like phones using emerging network interface technologies like internet protocol (IP), isoethernet, various forms of wireless, ATM, etc. Various types of additional telephones (ex. switch dependent phones, analog phones, cordless phones, conference phones), modems, fax machines or computers can be connected to the primary communications device 14.

Virtual Phone Structure

The actual virtual phone is represented by a set 20 of data structures, for example "C" language data structures that maintain the current status of the theoretical, i.e. virtual, phone. The data in these structures may change when an event occurs on the switch 12 or an adjunct digital phone 14, and the data gets passed up through the abstraction layer 28 and VPAPI 22. Also, the virtual phone structure information can change if an authorized external device 16 sends a VPAPI command 24.

The virtual phone structure 18 requires several bytes of RAM within the address range of an embedded microcontroller. The current state of the structures 20 matches what the switch 12 believes the digital phone 14 to be. Since it is possible for applications in processor 16 to take control away from the digital set 14, the virtual phone 20 and the digital phone 14 will not always have matching states. For example, if a digital phone and a cordless phone are connected to the same line, and voice is routed to the cordless, the switch thinks voice is active, and the digital phone does not.

The messages sent form the telephone switch 12 provide a representation of the state of the telephone 14 as it resides internally in the switch. The virtual phone 18 translates this state into a form that is not switch or phone dependent, but one that can represent any desired telephone or communications device. The virtual phone 18 is protocol and transport dependent.

Figure 2:
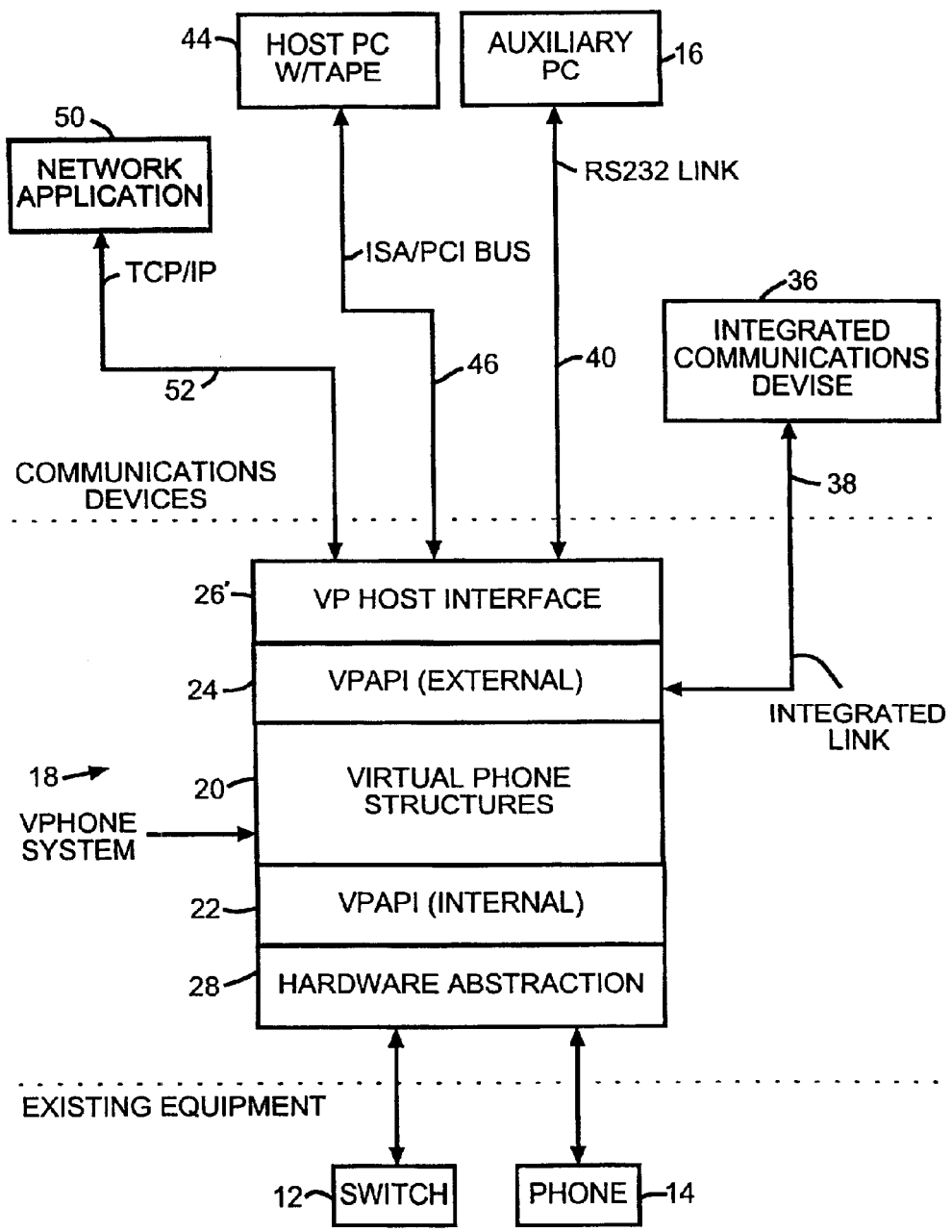
FIG. 2 is a block diagram illustrating the system of FIG. 1 in different types of phone integration implementations.

The virtual phone system of the present invention is designed to fit the needs of different types of phone integration implementations. Of the three major components of the software system (Virtual Phone Structure 20, VPAPI 22, 24 and VPHI 26), not all need to be used in every system implementation. This is illustrated in the overview of FIG. 2.

In a first typical implementation, there is a case where the host interface is not needed. When an external communications device 34 is integrated into the system, the host protocol is unused. The external device 36 can be controlled directly from the system software within the microcontroller via the VPAPI 24 via an integrated link 38.

The auxiliary PC 16 from the arrangement of FIG. 1 is shown connected to host interface 26' via an RS232 link 40.

In another example, all three major components are used. The external communications device is a computer 44 with an ISA link 46 to the virtual phone system. This host computer 44 runs a TAPI application. As messages are received from the switch 12, the abstraction layer 28 calls VPAPI functions which update the virtual phone structures 20 and convert the commands into a generic protocol that can be easily understood by the host system 44. Optionally, the data does not even need to be maintained in the virtual phone structures. The system can act simply as a protocol converter.

Also shown in the example of FIG. 2 is a network application 50 linked to the virtual phone system via a TCP/IP protocol link 52.

The virtual phone data structures 20 of the virtual phone system 18 of FIGS. 1 and 2 first will be described in detail, followed by description of the virtual phone application program interfaces 22, 24 and the abstraction layer 28. Accordingly, the following represents a description of all of the structures and defined variables that make up the structures 20 of the virtual phone system 18.

Main Control Structure

The following "C" language code illustrates the main virtual phone structure. One instance of this data structure is used to represent a single digital port.

| | | |
|---|---|---|
| typedef struc | | /* Main Virtual Phone Structure */ |
| VP_VOICE | voice; | /* voice status */ |
| VP_RINGER | ringer; | /* ringer status */ |
| VP_DISPLAY | display; | /*LCD display status */ |
| BYTE | num_buttons; | /* number of buttons actually in use */ |
| VP_BUTTON | button [VP_MAXBUTS]; | /* button/lamp status */ |
| BYTE | StandAlone; | /* operate without digital set */ |
| BYTE | SwitchType; | /* type of switch connected */ |
| BYTE | DigSetType; | /* Type of configured digital SET, if */ |
| BYTE | Connections; | /* Which Phone Units are physically connected */ |
| BYTE | ActivePhone; | /* Which Physical Phone Unit is active */ |
| BYTE | TouchedPhone; | /* Which Physical Phone Unit was last touched */ |
| BYTE | Carrier[2]; | /* 0=switch 1=digital set */ |
| BYTE | PassThroughFlags; | /* event block flags */ |
| BYTE | Voicemux; | /* Bearer channel direction */ |
| VIRTUAL_PHONE; | | |
| VP_VOICE | voice | References the voice control element of the virtual phone. This is described in greater detail in the section titled "Voice control structure". |
| VP_RINGER | ringer; | References the ringer control element of the virtual phone. This is described in greater detail in the section titled "Ringer control structure". |
| VP_DISPLAY | display | References the display control element of the virtual phone. This is described in greater detail in the section titled "Display control structure". |
| BYTE | num_buttons; | The number of the virtual buttons actually in use by the virtual phone. Although the virtual phone can support many buttons, some applications may limit the number of buttons in use. |
| VP_BUTTON | button [VP_MAXBUTS]; | References the button control element of the virtual phone. This is described in greater detail in the section titled "Button/Lamp control structure". |
| BYTE | StandAlone; | When TRUE, the system is operating without an adjunct digital phone. When FALSE, an adjunct digital phone is connected and operating. |
| BYTE | SwitchType; | The brand of PBX (or KSU) connected to the system. The valid phone types are represented by the following defines: |
| #define | PBX_NONE | 0 /* No PBX connected */ |
| #define | PBX-ATT | 1 /* AT&T switch connected */ |
| #define | PBX_M1 | 2 /* Meridian switch connected */ |
| #define | PBX_NORSTAR | 3 /* Norstar switch connected */ |
| #define | PBX_ROLM | 4 /* Rolm switch connected */ |
| #define | PBX_ISON | 5 /*ISON switch connected */ |
| BYTE | DigSetType; | The type of digital phone connected to the system. The valid phone types are represented by the following defines: |
| #define | SET_NONE | 0 /* Only when no PBX */ |
| #define | SET_UNKNOWN | 1 /* Connection, Unknown type */ |
| #define | SET_ROLM_400 | 10 /* Rolm Phone 400 */ |
| #define | SET_ROLM_240 | 11 /* Rolm Phone 240 */ |
| #define | SET_ROLM_120 | 12 /* Rolm Phone 120 */ |
| #define | SET_ROLM_600 | 13 /* Rolm Phone 600 */ |
| #define | SET_ROLM_300 | 14 /* Rolm Phone 300 */ |
| #define | SET_M1_2616 | 30 /* M1 2616 */ |
| #define | SET_NOR_7310 | 50 /* Norstar 7310 */ |
| #define | SET_NOR_7208 | 51 /* Norstar 7208 */ |
| #define | SET_NOR_7100 | 52 /* Norstar 7100 */ |
| #define | SET_NOR_7310LF | 53 /* Norstar 7310 BLF */ |
| #define | SET_NOR_7324 | 54 /* Norstar 7324 */ |
| #define | SET_ATT_7405 | 70 /* AT&T 7405 */ |
| #define | SET_ATT_7406 | 71 /* AT&T 7406 */ |
| #define | SET_ATT_7407 | 72 /* AT&T 7407 */ |
| #define | SET_ATT_7434 | 73 /* AT&T 7434 */ |
| #define | SET_ISON_1 | 90 /*ISON 1 */ |
| BYTE | Connections; | A mask of all of the physical phone connections made to the system. Multiple phones may be connected at any time. If the bit represented by the following defines is set in this field, the associated unit considered connected. |
| #define | PHONE_NONE | 0X00 /* No phones connected */ |
| #define | PHONE_ADJUNCT | 0x01 /* the Standard digital set */ |
| #define | PHONE_AUX | 0x02 /* phone app via debug port */ |
| #define | PHONE_CONF | 0.04 /* conference speaker phone */ |
| BYTE | ActivePhone; | Identifies which physical phone unit is currently active. A phone is defined to be active if it has control of the voice channel. The valid values for this field are the same as those defined for the "Connections" field above. |
| BYTE | Touched Phone; | Identifies which physical phone unit was last used by the |

-continued

| | | |
|---|---|---|
| BYTE | Carrier [2] | operator. This is used to determine the unit to receive "active" status. The valid values for this field are the same as those defined for the "Connections" field above. Identifies the carrier status of the switch and the phone. The first set of defines indexes the unit, the second set represents the status. |
| #define | CARRIER_DEVICE_SWITCH | 0/* switch device */ |
| #define | CARRIER_DEVICE_ADJUNCT | 1/* phone carrier device */ |
| #define | CARRIER_LEVEL_LOSS | 0/* No carrier */ |
| #define | CARRIER_LEVEL_GAIN | 1/* Carrier */ |
| #define | CARRIER_LEVEL_UNKNOWN | 2/* Unknown carrier state */ |
| BYTE | PassThroughFlags | A bit mask used to inform the abstraction layer which types of events should be passed between the switch and the phone, and which should be blocked. |
| #define | PASS_HOOK | 0x01 /* hook switch from set */ |
| #define | PASS_BUTTON | 0x02 /*buttons from set */ |
| #define | PASS_LAMP | 0x04 /*lamp updates from switch */ |
| #define | PASS_DISPLAY | 0x08 /* display update switch */ |
| #define | PASS_RINGER | 0x10 /* ring updates switch */ |
| BYTE | VoiceMux; | Identifies the direction of each of the available bearer channels. This is a bit mask with each bit representing each of the channels. There is typically one bit for the voice channel, and at least one bit for available data channels. When the bit is low, the channel is directed to the adjunct digital telephone. When the bit is high, the channel is directed to the alternate device. |
| #define | VMUX_ADJUNCT | 0 /* channel to digital set */ |
| #define | VMUX_AUX | 1 /* channel to alternate */ |
| #define | VMUX_VOICE | 0x01 /* bit 0: voice channel */ |
| #define | VMUX_DATA | 0x02 /* bit 1: 1st data channel */ |
| #define | VMUX_DATA1 | 0x02 /* bit 1: 1st data channel */ |
| #define | VMUX_DATA2 | 0x04 /* bit 2: 2nd data channel */ |

Voice Control Structure

The following "C" language code defines the structure used to represent the state of the voice channel. A single instance of this structure is built into the main virtual phone structure.

| | | | |
|---|---|---|---|
| typedefstruct | | | /* Virtual Phone Voice Structure */ |
| BYTE | active; | | /* 1=active 0=not active */ |
| BYTE | unit; | | /* mask active unit VOICE_???? */ |
| BYTE | volume; | | /* voice mute, low, high, etc. */ |
| VP_VOICE | | | |
| BYTE | active; | | When TRUE, the voice path is currently active. When FALSE, the voice path is not active. |
| BYTE | unit; | | Which unit (within the confines of the digital set) is currently used as the communications source. |
| #define | VOICE_HANDSET | 0x10 | /* Phone Handset Unit */ |
| #define | VOICE_SPEAKER | 0x20 | /* Phone Speaker Unit */ |
| #define | VOICE_HEADSET | 0x30 | /* Phone Headset Unit */ |
| BYTE | volume; | | The current sound level at which the system is operating. |
| #define | VOICE_MUTE | 0x01 | /* Volume is muted */ |
| #define | VOICE_NORMAL | 0x02 | /* Volume is normal */ |
| #define | VOICE_LOW | 0x03 | /* Volume is low */ |
| #define | VOICE_LOW | 0.04 | /* Volume is high */ |

Ringer Control Structure

The following "C" language code defines the structure used to represent the ring state of the virtual phone. A single instance of this structure is built into the main virtual phone structure.

| | | | |
|---|---|---|---|
| typedefstruct | | | /* Virtual Phone Ringer Structure */ |
| BYTE | | active; | /* 1:active 0=not active */ |
| BYTE | | cadence; | /* list of current cadence type */ |
| BYTE | | tone; | /* list of current tone type */ |
| VP_RINGER; | | | |
| BYTE | active; | | When TRUE, the ring state of the virtual phone is on. Typically, an audible ring indication can be heard. When FALSE, the ring state is off. |
| BYTE | cadence; | | One of the many difference types of ring cadence patterns a phone may select. This is valid when the ring state is active. |
| #define | RINGER_CAD_OFF | 1 | /* ring off */ |
| #define | RINGER_CAD_ON | 2 | /* ringer on steady */ |
| #define | RINGER_CAD_2 | 3 | /* ringer some on/off comb. */ |
| BYTE | tone; | | Once of the many different ring tones a phone may select. This is valid when the ring is active. |

-continued

```
#define    RINGER_TONE_OFF    1    /* tone off */
#define    RINGER_TONE_A      2    /* tone A */
#define    RINGER_TONE_B      3    /* tone B */
#define    RINGER_TONE_C      4    /* tone C */
#define    RINGER_TONE_D      5    /* tone D */
#define    RINGER_TONE_E      6    /* tone E */
#define    RINGER_TONE_F      7    /* tone F */
#define    RINGER_TONE_G      8    /* tone G */
#define    RINGER_TONE_H      9    /* tone H */
```

Display Control Structure

The following "C" language code defines the structure used to represent the LDC display of the virtual phone. A single instance of this structure is built into the main virtual phone structure.

| typedefstruct | | |
|---|---|---|
| | | /* Virtual Phone Display Structure */ |
| BYTE | grid [VP_MAXROWS] [VPD_MAXCOLS]; | /* The display text */ |
| VP_CURSOR | cursor [VPD_MAXCURSORS]; | /* current cursors*/ |
| BYTE | NumRows; | /* Number of Rows on this page */ |
| BYTE | NumColumns; | /* Number of Columns on this page */ |
| BYTE | NumCursors; | /* Number of available cursors */ |
| BYTE | IsStable; | /* True if the display has stabilized */ |
| BYTE VP_ DISPLAY; | IsClear; | /* True if the display is clear */ |
| BYTE | grid [VPD_MAXROWS] [VPD_MAXCOLS]; | The 2 dimensional array containing the characters on the display of the virtual phone. Each cell of the grid contains the character value in ASCII format. VPD_MAXROWS and VPD_MAXCOLS can be defined to support virtual displays of various sizes. |
| VP_CURSOR | cursor | [VPD_MAXCURSORS]; A list of cursors that are used by the display. Some displays have a single cursor, some have multiple cursors. This structure gives the abstraction layer control of all used cursor positions. |
| BYTE | NumColumns; | Number of columns on the display for the current virtual phone implementation. |
| BYTE | IsStable; | This is true if the display has been stable for a period of time determined by the abstraction layer. Only when the display goes stable does the information get transferred to the host. |
| BYTE | IsClear; | True if the display is clear. |

The following "C" language code defines the structure used to represent a cursor device of the virtual phone. The display functions may use several cursors which must be maintained in order to generate the correct display. This structure is part of the main display structure.

| typedef struct | | | |
|---|---|---|---|
| { | | | /* Virtual Phone Cursor Structure */ |
| | BYTE | row; | /* Current row for this cursor */ |
| | BYTE | col; | /* Current column for this cursor */ |
| }VP_BUTTON; | | | |
| BYTE | row; | | Current row for this cursor within the current display. |
| BYTE | col; | | Current column for this cursor within the current display. |

Button/Lamp Control Structure

The following "C" language code defines the structure used to represent a button/lamp device of the virtual phone. The main virtual phone structure uses a list of these items to represent all of the possible buttons/lamps on the phone.

| typedefstruct | | |
|---|---|---|
| | | /* Virtual Phone Button/Lamp Structure */ |
| BYTE | deviceMask; | /* mask showing which of next 4 are valid */ |
| BYTE | press ID; | /* ID of button press info */ |
| BYTE | release ID; | /* ID of button release info */ |
| BYTE | lamp1ID; | /* ID of first lamp */ |
| BYTE | lamp2ID; | /* ID of second lamp */ |
| BYTE | buttonState; | /* state of button: 1=down 0=up */ |
| BYTE | lamp1State; | /* state of first lamp */ |
| BYTE VP_BUTTON; | lamp2State; | /* state of second lamp */ |
| BYTE | deviceMask; | A mask which identifies the available components of the button/lamp. In some cases, button may exist without a lamp, in others, 2 lamps may relate to a single button. Also, some buttons have press and release codes, while others only have a press code. This mask validates the fields "pressID", "releaseID", "lamp1ID", and "lamp2ID" by setting the associated defined bit. |

-continued

| | | |
|---|---|---|
| #define | VDP_MASKPRESS | 0x01 /* "pressID" is valid */ |
| #define | VDP_MASKRELEASE | 0x02 /* "releaseID" is valid */ |
| #define | VDP_MASKLAMP1 | 0x04 /* "lamp1ID" is valid */ |
| #define | VD_MASKLAMP2 | 0x08 /* "lamp2ID" is valid */ |
| BYTE | pressID; | The raw integration dependent ID sent to the switch when the button is pressed. This field is only valid when the VDB_MASKPRESS bit is set in the "deviceMask" field. Typically, all keys have this field active. |
| BYTE | releaseID; | The raw integration dependent ID sent to the switch when the button is released. This field is only valid when the VDB_MASKRELEASE bit is set in the "deviceMask" field. Typically, keypad buttons do not use a release ID. |
| BYTE | lamp1ID; | The raw integration dependent ID sent by the switch during a lamp update. This field is only valid when the VDB_MASKLAMP1 bit is set in the "deviceMask" field. Buttons that do not have associated lights (such as keypad buttons) will not use this field. |
| BYTE | lamp2ID; | The raw integration dependent ID sent by the switch during a lamp update. This field is only valid when the VDB_MASKLAMP2 bit is set in the "deviceMask" field. AT&T is the only integration known to use a second lamp for a button/lamp device. |
| BYTE | buttonState; | Current state of the button. All buttons can be pressed or released. The hook switch is considered pressed when off hook, and released when on hook. |
| #define | BUTTON_PRESS | 1 /* button press */ |
| #define | BUTTON_RELEASE | 2 /* button release */ |
| BYTE | lamp1State; | Current state of the first (primary) lamp. The lamp can be in any of the following states. |
| #define | LAMP_STATE_OFF | 1 /* lamp off */ |
| #define | LAMP_STATE_ON | 2 /* lamp on */ |
| #define | LAMP_STATE_FLASH | 3 /* lamp flashing */ |

-continued

| | | |
|---|---|---|
| #define | LAMP_STATE_FLUTTER | 4 /* lamp fluttering */ |
| #define | LAMP_STATE_WINK | 5 /* lamp winking */ |
| #define | LAMP_STATE_FLICKER | 6 /* lamp flickering */ |
| #define | LAMP_STATE_MISC1 | 7 /* lamp misc */ |
| BYTE | lamp2State; | Current state of the second lamp (AT&T is the only switch that uses this). The lamp can be in any of the states as in the "lamp1State" field. |

Button/Lamp Index Descriptions

In the main virtual phone structure, the field "VP_BUTTON button [VP-MAXBUTS]" is used to store the button/lamp information for the virtual phone. The define VP_MAXBUTS determines the maximum number of buttons/lamps the virtual phone can contain. There are standard buttons in all configurations of the virtual phone. There are also additional buttons that may vary from phone to phone. The values shown below define the indices into the array of button/lamp control structures within the main virtual phone.

| | | |
|---|---|---|
| #define | KEY_HOOK | 0 /* Hook switch key */ |
| #define | KEY_HOLD | 1 /* Hold key */ |
| #define | KEY_XFER | 2 /* Transfer key */ |
| #define | KEY_RELEASE | 3 /* Release key */ |
| #define | KEY_PAD | 4 /* Key Pad 0–9, *, # */ |
| #define | KEY_NONFIXED | 16 /* -start of non-fixed buttons - */ |
| #define | KEY_PRIME | 16 /* Prime Line */ |
| #define | KEY_OTHER | 17 /* */ |
| KEY_HOOK | | The hook switch. When pressed, it is considered off hook. When released, on hook. All integrations have this key. |
| KEY_HOLD | | The standard hold key. All integrations have this key. |
| KEY_XFER | | The transfer key. All integrations have this key. |
| KEY_RELEASE | | The release key. All integrations have this key. |
| KEY_PAD | | The start of the key pad keys. The sequence of keys are in the following order. 0 through 9, *, and #. All integrations have these keys. |
| KEY_NONFIXED | | The starting ID of the non-fixed keys. Keys at this index for higher can be custom configured. |
| KEY_PRIME | | The key associated with a prime line. When the switch has a prime line configured for a phone, this index should reference that key. |
| KEY_OTHER | | Additional keys. Configuration is flexible. |
| VPAPI | | (Virtual Phone Application Program Interface) |

Access to the virtual phone structures is available through a set of symmetric functions known as the VPAPI 22 and 24. The VPAPI 22, 24 provides a mechanism to transfer data between the virtual phone data structures 20, and all devices (such as the switch 12, phones 14, and the external device 16). The data structures 20 are changed only via this interface, never directly by an external function 16. All elements of the data structures 20 can be modified, and read through the VPAPI 22, 24. Whenever the abstraction layer software 28 receives a change from the switch 12, digital phone 14, or external device 16, a call is made to a VPAPI function with parameters specifying the update request. The VPAPI function first validates the command request, and then makes the appropriate modification to the virtual phone structure.

Figure 3:
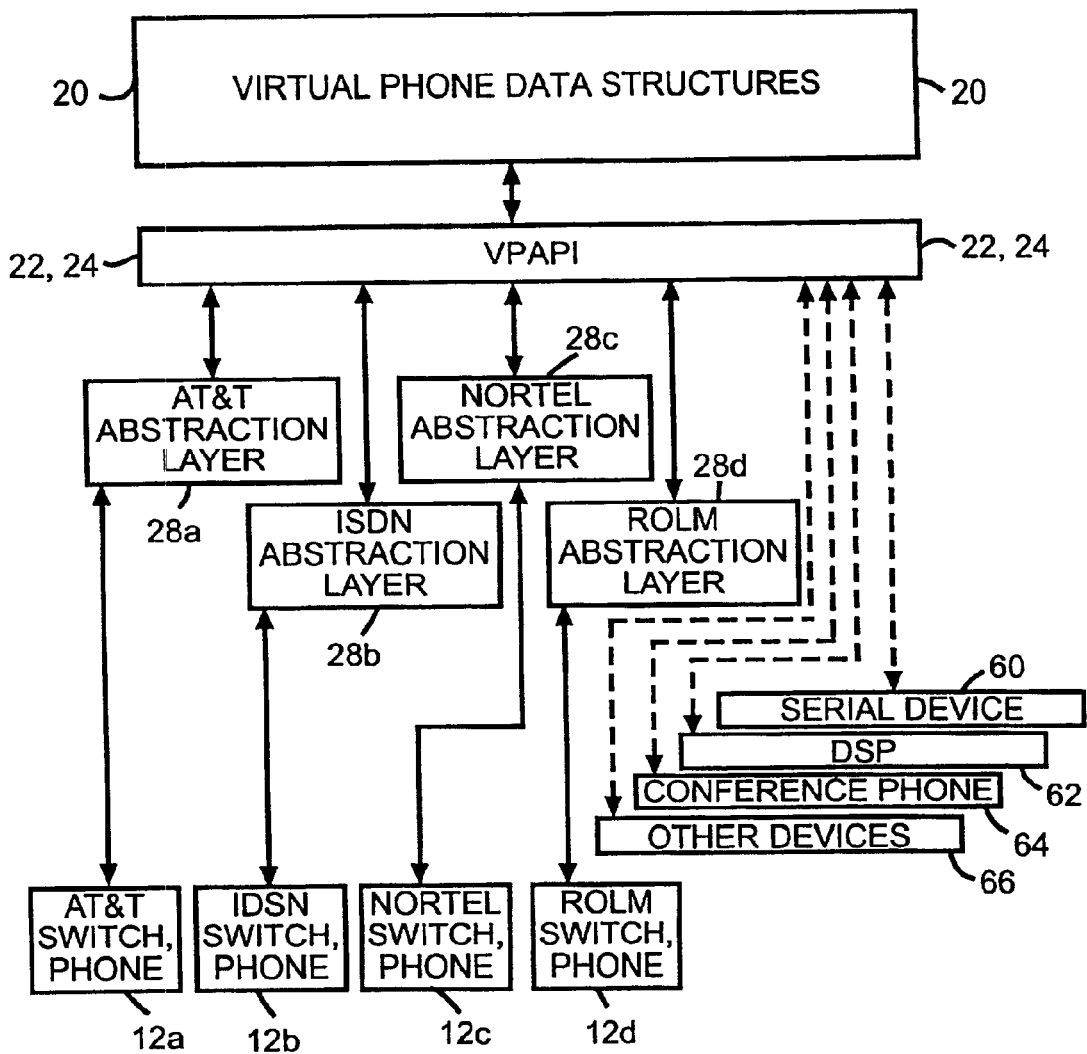
FIG. 3 is a block diagram further illustrating the virtual phone application program interface of the systems of FIGS. 1 and 2.

As shown in FIG. 3, for different switches 12*a*, 12*b*, 12*c* and 12*d* and phones 14*a*, 14*b*, 14*c*, 14*d* from various vendors different abstraction layers 28*a*, 28*b*, 28*c* and 28*d* are provided. The VAPI 22, 24 also provide data transfer between the virtual phone data structures 20 and various devices such as serial devices 60, DSP 62, conference phones 64 and other devices 66.

Whenever a valid state change is made to the virtual phone structure 20, the VPAPI 24 calls a second function which is responsible for converting the information into a generic protocol (Host Interface 26), and transmitting it via the host interface 16 to the host system.

The abstraction layer 28 (and external device queries) often need information on the current state of the virtual phone. Symmetric VPAPI 22, 24 functions are used for this purpose and for all aspects of data access. In order to retrieve current status information and pass that information to the abstraction layer 28 and an external device 16, a function beginning with "vp_Get" is used. To modify data, "vp_Set" is used, which in turn automatically calls a function beginning with "vp_Send" for external transfer. Or, for example, to set a light state in the virtual phone structure, a call is made to "vp_SetLampState" with the lamp ID and state as parameters. For the abstraction layer 28 or external device 16 to get the light state, a call to the symmetric function "vp_GetLampState" is made.

The abstraction layer 28 (and external device queries) often need information regarding the current state of the virtual phone. Symmetric VPAPI functions are available for this purpose. Thus, during the processing of switch and phone packets, the abstraction layer 28 often calls the VPAPI functions 22, 24 to maintain current status of the digital phone 14 in the virtual phone data structures 20. Primarily, the "vp_Set" type functions are used. When a simulated event occurs, such as a generic cordless unit going off hook, the application code may also make a call to the "vp_Set" function, causing the system to be in the off hook state. Also note that in order for the simulated event to affect the switch, it must pass through the abstraction layer through an API function of the form "vprolm_DoButton" for example.

Figure 4:
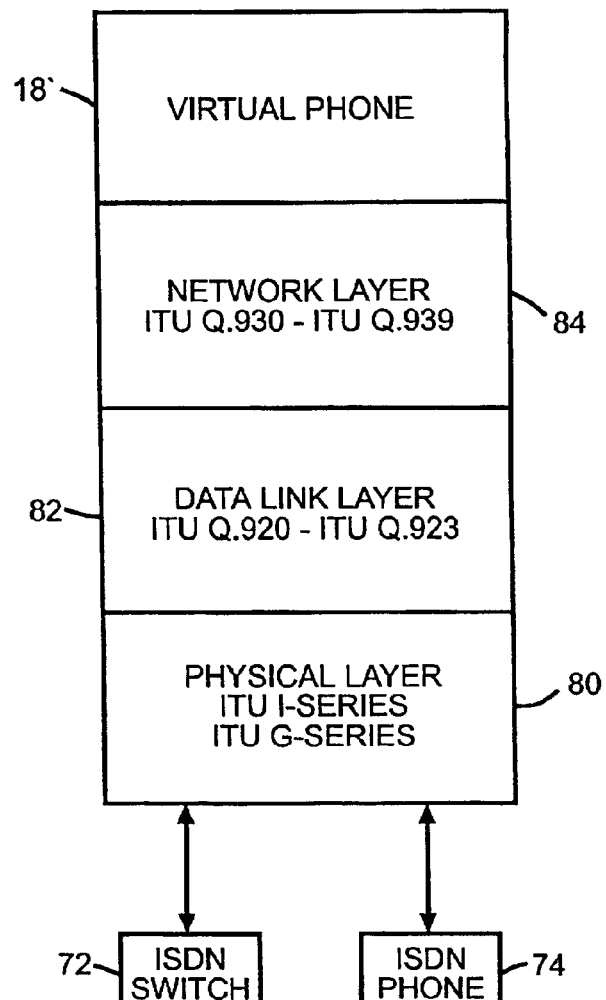
FIG. 4 is a block diagram of an illustrative implementation of the abstraction layer in the systems of FIGS. 1 and 2.

The hardware abstraction layer 28 is not part of the virtual phone, but is a system component used to interface between the switch 12 (and phone 14) and the virtual phone 18. The specifications for building this block vary for each switch type. In the example of FIG. 4, building of an ISDN integration is shown for use with an ISDN switch 72 and ISDN phone 74.

The first layer 80 (Physical layer) of the hardware abstraction can be built based on the international standards ITU I-series and ITU G-series documents. The second layer 82 (Data Link layer) is defined in the ITU Q.920 through Q.923 documents. The third layer 84 (Network layer) is defined in the ITU Q.930 through Q.939 documents. These specifications taken together define how to build the hardward abstraction block 28 for virtual phone support built on top of an ISDN switch.

Initialization Functions

The following functions are used for initialization and are typically only called system on startup.

| | |
|---|---|
| vp_init ( ) | Performs general virtual phone initialization such as allocating data and variable initialization. This function is called by the main application once during startup. |
| vp_init_pbx_type ( ) | Performs initialization specific to a particular switch. This function is called automatically by the virtual phone system when the VPAPI function "vp_SetPbxType" is called. Normally, this happens only once at startup. |
| vp_init_set_type ( ) | Performs initialization specific to a specific digital telephone. This function is called automatically by the virtual phone system when the VPAPI function "vp_SetSetType" is called. Normally, this happens only once at startup. |

Configuration Control Functions

These functions are used to manage system configuration information between the main application and the virtual phone.

vp_SendPbxType (BYTE resp)
vp_GetPbxType (BYTE *type)
vp_SetPBXType (BYTE type)

The foregoing three functions configure the virtual phone 20 with the current physically connected type of switch 12. After the main application determines which switch is connected, it calls the Set function. The Set function automatically call vp_init_pbx_type ( ).

type One of the following defined variables representing the switch type.

| | |
|---|---|
| PBX_NONE | No switch connected (default) |
| PBX_ATT | AT&T switch connected |
| PBX_M1 | Meridian switch connected |
| PBX_NORSTAR | Norstar switch connected |
| PBX_ROLM | Rolm switch connected | resp The type of data to be transmitted to the serial port.

| | |
|---|---|
| QUERY_RESPONSE | No change, serial packet is due to a query |
| DELTA_RESPONSE | The state of the virtual phone has changed | vp_SendSetType (BYTE resp)
vp_GetSetType (BYTE *type)
vp_SetSetType (BYTE type)

The foregoing three functions configure the virtual phone 20 with the current physically connected type of digital telephone. After the main application 16 determines which digital phone is connected, it calls the set function. The Set function automatically calls vp_init_set_type ( ).

type One of the following defined variables representing the switch type.

| | |
|---|---|
| SET_NONE | No digital phone connected (default) |
| SET_UNKNOWN | Digital set of unknown type connected |
| SET_ROLM_400 | Rolm RP400 set connected |
| SET_ROLM_240 | Rolm RP240 set connected |
| SET_ROLM_120 | Rolm RP120 set connected |
| SET_ROLM_600 | Rolm 600 series set connected |
| SET_ROLM_300 | Rolm 300 series set connected |
| SET_M1_2616 | Meridian 2616 set connected |
| SET_NOR_7310 | Norstar 7310 set connected |
| SET_NOR_7208 | Norstar 7208 set connected |
| SET_NOR_7100 | Norstar 7100 set connected |
| SET_NOR_7310BLF | Norstar 7310 BLF set connected |
| SET_NOR_7324 | Norstar 7324 set connected | resp The type of data to be transmitted to the serial port 26.

| | |
|---|---|
| QUERY_RESPONSE | No change, serial packet is due to a query |
| DELTA_RESPONSE | The state of the virtual phone has changed | vp_SendConnections (BYTE resp)
vp_GetConnections (BYTE *mask)
vp_SetConnections (BYTE mask)
    The foregoing three functions configure the virtual phone 20 with a list of physically connected phones. The main application 16 will determine the types of phone units that will have access to the system. Once determined, it calls this functions with a mask representing current connections.
    mask A bit mask used to correspond to up to 8 phone units. If the bit for given phone type is on in the mask, that phone is connected in the system.

| | |
|---|---|
| PHONE_NONE | No phones connected (default) |
| PHONE_ADJUNCT | The compatible digital phone is connected |
| PHONE_AUX | The serial link based phone is connected |
| PHONE_CS1000 | The analog conference phone is connected | resp The type of data to be transmitted to the serial port 26.

| | |
|---|---|
| QUERY_RESPONSE | No change, serial packet is due to a query |
| DELTA_RESPONSE | The state of the virtual phone has changed |

Voice MUX Control Functions

When multiple phones are connected to the system at one time, it is necessary to maintain which of the phones is physically in use. The virtual phone 20 needs this information so that it can direct voice data to the proper phone. Once a phone has "control" of the voice, the virtual phone 20 is responsible for blocking other units from taking dangerous actions (such as terminating the call).

The key elements the virtual phone 20 is concerned with are the current control, and the last touched unit. These values enable the virtual phone to manage call control seamlessly between connected phone units.

vp_SendActivePhone (BYTE) resp)
vp_GetActivePhone (BYTE *type)
vp_SetActivePhone (BYTE type)
    The foregoing three functions configure the virtual phone 20 with the current active phone 14. A phone is considered active if the voice path is active, and is directed toward that phone. The active phone is also known to be the phone with "control".
    type The phone type ID of the connected phones that currently has control. The phone type must be in the connections mask list.

| | |
|---|---|
| PHONE_NONE | Idle, no phones have control (default) |
| PHONE_ADJUNCT | The compatible digital phone has control |
| PHONE_AUX | The serial link based phone has control |
| PHONE_CS1000 | The analog conference phone has control | resp The type of data to be transmitted to the serial port.

| | |
|---|---|
| QUERY_RESPONSE | No change, serial packet is due to a query |
| DELTA_RESPONSE | The state of the virtual phone has changed | vp_SendTouchedPhone (BYTE resp)
vp_GetTouchedPhone (BYTE *type)
vp_SetTouchedPhone (BYTE type)
    The foregoing three functions configure the virtual phone 20 with the last touched phone. When the user presses a button, or goes off hook on a particular phone, it is considered touched. When a call is terminated, no phones are considered touched. The phone to go active will always be the phone with the current touched status.
    type The phone type ID if the connected phones that was last used by the operator. The phone type must be in the connections mask list.

| | |
|---|---|
| PHONE_NONE | Idle, no phones have control (default) |
| PHONE_ADJUNCT | The compatible digital phone has control |
| PHONE_AUX | The serial link based phone has control |
| PHONE_CS1000 | The analog conference phone has control | resp The type of data to be transmitted to the serial port.

| | |
|---|---|
| QUERY_RESPONSE | No change, serial packet is due to a query |
| DELTA_RESPONSE | The state of the virtual phone has changed. |

Voice Control Functions

The functions are used to manage all voice related information within the virtual phone 20. Voice active status, volume, and physical unit on a phone are all maintained.

vp_SendVoiceState (BYTE resp)
vp_GetVoiceLevel (BYTE *level)
vp_GetVoiceUnit (BYTE *unit)
vp_GetVoiceVolume (BYTE *volume)
vp_SetVoiceLevel (BYTE level)
vp_SetVoiceUnit (BYTE unit)
vp_SetVoiceVolume(BYTE volume)

The foregoing seven functions configure the virtual phone 20 with the current voice status. Whenever the switch 12 activates or deactivates the voice path, these functions are called. Some switches and phones have the ability to activate the voice path at different volumes, and on different units (such as headset or speakerphone).

level When TRUE, the system voce path is active. When FALSE, it's inactive. See vp_GetActivePhone to determine which phone has control of the voice path.

unit The unit on the phone which is in use by the operator.

| | |
|---|---|
| VOICE_HANDSET | The standard handset found on most phones |
| VOICE_SPEAKER | The speaker/microphone (found on some phones) |
| VOICE_HEADSET | An auxiliary headset unit (usually a separate plug in device) | volume The volume at which voice can be heard through the phone.

| | |
|---|---|
| VOICE_MUTE | Voice active, but volume muted |
| VOICE_NORMAL | Normal voice volume |
| VOICE_LOW | Volume audible, but lower than normal |
| VOICE_HIGH | Volume higher than normal | resp The type of data to be transmitted to the serial port.

| | |
|---|---|
| QUERY_RESPONSE | No change, serial packet is due to a query |
| DELTA_RESPONSE | The state of the virtual phone has changed |

Ringer Control Functions

These functions are used to manage all ringer related information within the virtual phone 20. Ringer active status, cadence, and tone during ring are all maintained.

vp_SendRingerState (BYTE resp)
vp_GetRingerLevel (BYTE *level)
vp_SetRingerCadence (BYTE *cadence)
vp_GetRingerTone (BYTE *tone)
vp_SetRingerLevel (BYTE level)
vp_SetRingerCadence (BYTE cadence)
vp_SetRingerTone (BYTE tone)

The foregoing seven functions configure the virtual phone 20 with the current ringer status. Whenever the switch 12 turns the audible ringer on or off, these functions are called. Different switches use different ring cadences and ring tones. The virtual phone 20 maintains this information.

level When TRUE, the ringer is considered active. On some switches, the ringer may be active for the full duration of a ring cycle. In others, it may be active only when the audible ringing sound is heard. When FALSE, the ringer is not active.

cadence The cadence at which the switch is sending the ring signal.

| | |
|---|---|
| RINGER_CAD_OFF | No ring cadence |
| RINGER_CAD_ON | Standard ring cadence active |
| RINGER_CAD_2 | Alternate ring cadence active |

Tone The tone at which the ring is heard.

| | |
|---|---|
| RINGER_TONE_OFF | No audible tone |
| RINGER_TONE_A | Tone A |
| RINGER_TONE_B | Tone B |
| RINGER_TONE_C | Tone C |
| RINGER_TONE_D | Tone D |
| RINGER_TONE_E | Tone E |
| RINGER_TONE_F | Tone F |
| RINGER_TONE_G | Tone G |
| RINGER_TONE_H | Tone H | resp The type of data to be transmitted to the serial port.

| | |
|---|---|
| QUERY_RESPONSE | No charge, serial packet is due to query |
| DELAT_RESPONSE | The state of the virtual phone has changed |

Lamp Control Functions

These functions are used to manage all lamp (LED or light) related information within the virtual phone 20. Many lamps typically exist on a given system. The virtual phone has the facility to store the state of any of these lamps. It is also possible to pass the lamp update information directly to the host system. In this case, the virtual phone just passes the information through without maintaining it.

In the case where the lamp is stored in the virtual phone, any of the functions can be used to read or write data. The functions with the "V" in the name require the virtual phone index of the lamp. The remaining functions work directly with the raw ID. The "Ex" of extended functions allow for multiple bytes of raw ID information.

When the lamp status is not maintained within the virtual phone structures, only the functions working with the raw IDs can be used. These functions will simply pass the update information directly to the host without storing any information within the virtual phone structures.

vp_SendVLampState (BYTE resp, BYTE vid)
vp_SendLampState (BYTE resp, BYTE len, BYTE*rawidlist, BYTE state)
vp_GetVLampState (BYTE vid, BYTE *state)
vp_SetVLampState (BYTE vid, BYTE state)
vp_SetLampState (BYTE rawid, BYTE state)
vp_SetLampState (BYTE len, BYTE *rawidlist, BYTE state)

rawid The raw ID sent from the switch. The virtual phone checks to see if this lamp is configured as part of the defined phone. If so, a look up is done to get the virtual index (vid) of the correct button/lamp index.

rawidlist A list of raw IDs sent from the switch. This is used when more than one byte of information is needed to reference the lamp. The "len" parameter is used to define the number of bytes in this list.

len The number of bytes in the "rawidlist".
state The state of the lamp.

| | |
|---|---|
| LAMP_STATE_OFF | Lamp is dark |
| LAMP_STATE_ON | Lamp light is on steady |
| LAMP_STATE_FLASH | Lap is on in a flashing pattern |
| LAMP_STATE_FLUTTER | Lamp is on in a fluttering pattern |
| LAMP_STATE_WINK | Lamp is on in a winking pattern |
| LAMP_STATE-FLICKER | Lamp is on in a flickering pattern |
| LAMP_STATE_MISC1 | Lamp is on in an unknown pattern | vid The ID within the virtual phone 20 for the lamp. Each Button/Lamp control structure has fields for lamp information. Only certain buttons/lamps are defined to be as part of the virtual phone 20. This field is an index into the virtual phone's button/lamp structure. (See section Button/Lamp index descriptions)

resp The type of data to be transmitted to the serial port 26.

| | |
|---|---|
| QUERY_RESPONSE | No change, serial packet is due to a query |
| DELTA_RESPONSE | The state of the virtual phone has changed |

Button Control Function

These functions are used to manage all button and hook switch related information within the virtual phone. A hook switch and many buttons typically exist on a given system. The virtual phone has the facility to store the state of any of these buttons. It is also possible to pass the button press/release information directly to the host system. In this case, the virtual phone just passes the information through without maintaining it.

The hook switch is considered a button and is always defined as button number zero in the virtual phone.

In the case where the button is stored in the virtual phone, any of the functions can be used to read or write data. The functions with the "V" in the name require the virtual phone index of the button. The remaining functions work directly with the raw ID. The "Ex" of extended functions allow for multiple bytes of raw ID information.

When the button status is not maintained within the virtual phone structures, only the functions working with the raw IDs can be used. These functions will simply pass the update information directly to the host without storing any information within the virtual phone structures.

vp_SendVButtonState (BYTE resp, BYTE vid)
vp_SendButtonState (BYTE resp, BYTE len, BYTE*rawidlist, BYTE state)
vp_GetVButtonState (BYTE vid, BYTE *state)
vp_SetVButtonState (BYTE vid, BYTE state)
vp_SetButtonState (BYTE rawid, BYTE state)
vp_SetButtonState (BYTE len, BYTE *rawidlist, BYTE state)

rawid The raw ID sent from the switch. The virtual phone 20 checks to see of this button is configured as part of the defined phone. If so, it is used to reference the correct button/lamp index.

rawidlist A list of raw IDs sent from the switch. This is used when more than one byte of information is needed to reference the button. The "len" parameter is used to define the number of bytes in this list.

len The number of bytes in the "rawidlist".

state The State of the button or hook switch. Buttons can be either pressed or released. The hook switch is considered pressed when off hook, and released when on hook.
BUTTON_PRESS Button has been pressed
BUTTON_RELEASE Button has been released vid The ID within the virtual phone 20 for the button or hook switch. Each Button/Lamp control structure has fields for button information. Only certain buttons/lamps are defined to be as part of the virtual phone. This field is an index into the virtual phone's button/lamp structure. (See section Button/Lamp index descriptions).

resp The type of data to be transmitted to the serial port.
QUERY_RESPONSE No change, serial packet is due to a query
DELTA_RESPONSE The state of the virtual phone has changed Hook Switch Control Functions The hook switch is just a button. Button index zero is always fixed to the hook switch. Because of this, the button API calls can be used for hook switch control. However, for simplication sake, a set of API function are provided for direct hook switch control.

vp_SendHookState (Byte resp)
vp_SetHook_State (BYTE state)
vp_GetHookState (BYTE *state)

state The state of the book switch.
HOOK_OFF Off hook (Same as button press)
Hook_ON On hook (Same as button release)

resp The type of data to be transmitted to the serial port.
QUERY_RESPONSE No change, serial packet is due to a query
DELTA_RESPONSE The state of the virtual phone has changed Display Control Functions The virtual phone supports the ability to maintain a flexible display. These functions provide the abstraction layer the ability to build the display in a way similar to how the switch puts information on the display.

The abstraction layer calls the "update" functions to send text changes to the display as they are received from the switch. Addressing is either direct (by row and column number), or based on a cursor position. The switch often clears single rows or even the entire display with one command. An API function exists for each of these tasks.

Often, more than one cursor exists for a given display. The abstraction layer passes the cursor index whenever a display update at cursor type command is given. An API command exists to maintain each current cursor position.

When the display has been stable (has not changed) for a given period of time, or the switch sends a "display stable" command, the abstraction layer calls the "vp_dDisplayIsStable" function. This triggers the virtual phone to send the display contents to the host.

vp_SendDisplay (BYTE resp)
vp_dDisplayIsStable( )
vp_dClearDisplay( )
vp_dClearRow (BYTE row)
vp_dSetCursor Position (BYTE cindex, BYTE row, BYTE col)
vp_dUpdateCharAtCursor (BYTE cindex, BYTE ch)
vp_dUpdateCharAtCursor (BYTE cindex, BYTE *txt, BYTE len)

vp_dUpdateCharAbsolute (BYTE row, BYTE col, BYTE ch)

vp_dUpdateTextAbsolute (BYTE row, BYTE col, BYTE *txt, BYTE len)

| | |
|---|---|
| cindex | The index of the cursor to be used to execute the function. This index is maintained separately and contains a row and column of where the text will be displayed. |
| row | The row number on which the text will be displayed. |
| col | The column number on which the text will be displayed. |
| resp | The type of data to be transmitted to the serial port. QUERY_RESPONSE No change, serial packet is due to a query DELTA_RESPONSE the state of the virtual phone has changed |
| ch | The ASCII character to be displayed. |
| txt | The ASCII text string to be displayed. |
| len | The number of characters in the ASCII text string to be displayed. |

Carrier Control Functions

The virtual phone maintains the carrier state of the switch, and the adjunct digital phone. This information is available via the following functions.

vp_SendCarrier (BYTE resp, BYTE device)
vp_SetCarrier (BYTE device, BYTE level)
vp_GetCarrier (BYTE device, BYTE *level)
   device The physical device.
      CARRIER_DEVICE_SWITCH The switch
      CARRIER_DEVICE_ADJUNCT The adjunct digital phone
   level The carrier level
      CARRIER_LEVEL_LOSS No carrier for the device
      CARRIER_LEVEL_GAIN The device has carrier
      cARRIER_LEVEL_UNKNOWN Carrier state unknown
   resp The type of data to be transmitted to the serial port.
      QUERY_RESPONSE No change, serial packet is due to a query
      DELTA_RESPONSE The state of the virtual phone has changed Pass Through Control Functions It is possible to block certain types of messages between the switch and the digital phone. The pass through flags set which messages are allowed to pass through, and which are blocked. The following APIs provide this functionality.

vp_SendPAssThroughFlags (BYTE resp)
vp_SetPassThroughFlags (BYTE flags)
vp_GetPassThroughFlags (BYTE *flags)
   flags A bit mask with each bit representing a different pass through mode. If the bit is set, the message is allowed to pass. If cleared, the message is blocked.

| | |
|---|---|
| PASS_HOOK | hook switch from digital set |
| PASS_BUTTON | button presses/releases from digital set |
| PASS_LAMP | lamp updates from switch |
| PASS_DISPLAY | display updates from switch |
| PASS_RINGER | ringer updates from switch | resp The type of data to be transmitted to the serial port.
      QUERY_RESPONSE No change, serial packet is due to a query
      DELTA_RESPONSE The state of the virtual phone has changed Bearer Channel Control Functions The voice and data channels can be routed normally to the adjunct digital phone, or to another device. These functions control the routing of these bearer channels. The system may want to instruct the virtual phone to send voice or data information to a unit other than the adjunct phone such as a conference phone or a DSP for processing.

Since the digital data link between the switch and the phone typically provides a voice channel and at least one data channel, these functions use a bit mask to identify which of the channels to control.

vp_SendVoiceMux (BYTE resp)
vp_SetVoiceMux (BYTE devicemask, BYTE unit)
vp_GetVoiceMux (BYTE devicemask, BYTE*unit)
   devicemask A bit mask with each bit representing one of the bearer channels to direct with the command

| | |
|---|---|
| VMUX_VOICE | voice channel |
| VMUX_DATA | data channel |
| VMUX_DATA1 | primary data channel |
| VMUX_DATA2 | secondary data channel | unit The device where the channel is to be directed.
      VMUX_ADJUNCT Adjust digital telephone
      VMUX_AUX The other connected unit (DSP, conference phone, etc.)
   resp The type of data to be transmitted to the serial port.
      QUERY_RESPONSE No change, serial packet is due to a query
      DELTA_RESPONSE The State of the virtual phone has changed Virtual Phone Host Interface Protocol Communications between the virtual phone 20 and the external device, i.e. host system, is accomplished via an internally designed custom protocol called the Virtual Phone Host Interface Protocol (VPHIP) 26. Any time the virtual phone changes, a VPHIP packet is sent out to the host reflecting the update to the virtual phone structure. This keeps the auxiliary PC 16 up to date at all times with the current status of the virtual phone.

The auxiliary PC 16 also has the ability to manipulate the virtual phone by sending VPHIP packets across the link. The virtual phone parses the VPHIP packet and calls the apropriate VPAPI function, which in turn may update the virtual phone structure.

The functionality and structure of VPHIP is described follows:

Packet Format

All packets adhere to the following format:

| Length | Description | Value |
|---|---|---|
| 1 Byte | Header | see note |
| 1 Byte | Packet Length | variable |
| 1 Byte | Packet Description | see below sections |
| Variable | Packet Data | see below sections |

The header byte follows specific rules. Any message originating from the switch 12 has a header of 0x01. Messages from the adjunct phone 14 have header 0x02. Messages from the auxiliary PC 16 have header 0x04. Informational messages (such as PBX type) have header 0x00. Queries, and responses to queries turn on the upper most bit of the header which result in header codes of 0x08, 0x81 and 0x82.

System Information messages

System information packets are used to communicate phone status information between the internal virtual phone 20 and the auxiliary PC 16. All system information packets have a header value of 0x00.

Carrier State

These packet types are used to identify the carrier condition of the switch or the digital telephone.

| Byte | Description | Value |
|---|---|---|
| 0 | Header | 0x00 |
| 1 | Packet Length | 4 |
| 2 | Carrier (Switch) | 0xB0 |
| 3 | Carrier Level | |
| | No Carrier | 0 |
| | Carrier | 1 |
| | Unknown Condition | 2 |
| 0 | Header | 0x00 |
| 1 | Packet Length | 4 |
| 2 | Carrier (Digital Set) | 0xB1 |
| 3 | Carrier Level | |
| | No Carrier | 0 |
| | Carrier | 1 |
| | Unknown Condition | 2 |

Adjunct Phone Type

The adjunct phone type packet is used to identify the type of digital phone (if any) that is physically connected to the interface board.

| Byte | Description | Value |
|---|---|---|
| 0 | Header | 0x00 |
| 1 | Packet Length | 4 |
| 2 | Adjunct Phone Type | 0xF1 |
| 3 | Phone Index | |
| | None | 0 |
| | Unknown | 1 |
| | Rolm RP400 | 10 |
| | Rolm RP240 | 11 |
| | Rolm RP120 | 12 |
| | Rolm RP600 | 13 |
| | Rolm RP300 | 14 |
| | M1 2616 | 30 |
| | Norstar 7310 | 50 |
| | Norstar 7208 | 51 |
| | Norstar 7100 | 52 |
| | Norstar 7310 BLF | 53 |
| | Norstar 7324 | 54 |
| | AT&T 7405 | 70 |
| | AT&T 7406 | 71 |
| | AT&T 7407 | 72 |
| | AT&T 7434 | 73 |

Current Active Phone

When more than one phone is connected to the interface board at the same time, it is often necessary to know which unit is actively communicating with the switch 12. This is necessary to establish such things as voice routing, and button filtering. This packet returns the physical phone description that is currently active.

| Byte | Description | Value |
|---|---|---|
| 0 | Header | 0x00 |
| 1 | Packet Length | 4 |
| 2 | Active Phone Type | 0xF2 |
| 3 | Unit Index | |
| | None | 0x00 |
| | Adjunct Digital Set | 0x01 |
| | Auxiliary | 0x02 |
| | Conference Phone | 0x04 |
| | future use | 0x08 . . . |

Last Touched Phone

When more than one phone is connected to the interface board at the same time, the user may operate either unit to make and receive calls. Knowing which physical unit was last touched enables the virtual phone 20 to route voice and control to the appropriate unit.

| Byte | Description | Value |
|---|---|---|
| 0 | Header | 0x00 |
| 1 | Packet Length | 4 |
| 2 | Touched Phone Type | 0xF3 |
| 3 | Unit Index | |
| | None | 0x00 |
| | Adjunct Digital Set | 0x01 |
| | Auxiliary | 0x02 |
| | Conference Phone | 0x04 |
| | future use | 0x08 . . . |

Physical Connections

The virtual phone 20 may support several controlling and/or monitoring devices simultaneously. This command is used to transfer the current configuration information. The connection information is stored as a bit mask providing space for up to 8 physical devices.

| Byte | Description | Value |
|---|---|---|
| 0 | Header | 0x00 |
| 1 | Packet Length | 4 |
| 2 | Physical Cncts Type | 0xF4 |
| 3 | Connection Mask | |
| | None | 0x00 |
| | Adjunct Digital Set | 0x01 |
| | Auxiliary | 0x02 |
| | Conference Phone | 0x04 |
| | future use | 0x08 . . . |

Messages from the Switch

All messages originating from the switch 12 have a of 0x01.

Voice Status

The Voice Status packets are used to supply the current voice status to the auxiliary PC 16. The physical unit being used, and the volume are also supplied.

| Byte | Description | Value |
|---|---|---|
| 0 | Header | 0x01 |
| 1 | Packet Length | 5 |
| 2 | Voice Enable | 0x10 |
| 3 | Unit | |
| | Handset | 0x01 |
| | Speaker | 0x02 |
| | Headset | 0x04 |
| 4 | Volume | |
| | Mute | 0 |
| | Normal | 1 |
| | Low | 2 |
| | High | 3 |

| Byte | Description | Value |
|---|---|---|
| 0 | Header | 0x01 |
| 1 | Packet Length | 3 |
| 2 | Voice Disable | 0x11 |

The Voice Enable command (0x10) explicitly activates the voice channel regardless of unit state. Voice Disable (0x11) explicitly de-activates voice. The Voice Status command (0x12) is a combination of the two where the presence of a bit in the unit mask is used to determine whether or not voice is active.

| Byte | Description | Value |
|---|---|---|
| 0 | Header | 0x01 |
| 1 | Packet Length | 5 |
| 2 | Voice Status | 0x12 |
| 3 | Unit | |
| | Handset | 0x01 |
| | Speaker | 0x02 |
| | Headset | 0x04 |
| 4 | Volume | |
| | Mute | 0 |
| | Normal | 1 |
| | Low | 2 |
| | High | 3 |

Ringer Status

The ringer status packets are used to supply ringer status to the auxiliary PC 16. In addition to ringer status, the cadence and ring tone are also supplied. In some switches, the ringer turns on and off with the audible sound while the calling party is attempting to connect. It may be beneficial to leave the ringer in the "on" state and have the virtual phone use the "cadence off" condition between audible rings. This will give feedback similar to that of using the LED for incoming call status.

| Byte | Description | Value |
|---|---|---|
| 0 | Header | 0x01 |
| 1 | Packet Length | 5 |
| 2 | Ringer Active | 0x20 |
| 3 | Cadence | |
| | Off | 0 |
| | On | 1 |
| | #2 | 2 |
| 4 | Tone | |
| | Off | 1 |
| | A | 2 |
| | B | 3 |
| | C | 4 |
| | D | 5 |
| | E | 6 |
| | F | 7 |
| | G | 3 |
| | H | 9 |

| Byte | Description | Value |
|---|---|---|
| 0 | Header | 0x01 |
| 1 | Packet Length | 3 |
| 2 | Ringer Inactive | 0x21 |

Lamp Status (Generic)

The Lamp status packet is used to supply lamp (LED) information to the Auxiliary PC 16. The internal virtual phone lamp ID (not the switch's raw ID), and the flash rate are passed in the packet.

| Byte | Description | Value |
|---|---|---|
| 0 | Header | 0 x 01 |
| 1 | Packet Length | 5 |
| 2 | Lamp Update | 0 x 30 |
| 3 | Flash Rate | |
| | Off | 1 |
| | On | 2 |
| | Flash | 3 |
| | Flutter | 4 |
| | Wink | 5 |
| | Flicker | 6 |
| | Misc1 | 7 |
| 4 | Lamp ID | |
| | Prime Line | 16 |
| | Others | 17 |

Lamp Status (Raw)

The Raw lamp status packet is used to supply lamp (LED) information to the auxiliary PC. The raw ID received from the switch (not the internal virtual phone ID), and the flash rate are passed in this packet.

In the case where lamps have multiple bytes for the ID, the additional bytes are placed at the end of the packet and the length is changed accordingly.

| Byte | Description | Value |
|---|---|---|
| 0 | Header | 0 × 01 |
| 1 | Packet Length | 4 + number of raw ID bytes |
| 2 | Lamp Update (Raw) | 0 × 31 |
| 3 | Flash Rate | |
| | Off | 1 |
| | On | 2 |
| | Flash | 3 |
| | Flutter | 4 |
| | Wink | 5 |
| | Flicker | 6 |
| | Misc1 | 7 |
| 4 | Lamp raw ID byte #1 | |
| 5 | [Lamp raw ID byte #2] | |

Display Status

The Display status packets are used to supply display information to the auxiliary PC. These packets allow for portions of the display to be updated as they are received from the switch. The basis display packet supplies text and position information (the length can be extracted from the packet length byte). There are other special packets that can be used for scrolling of flashing characters on the auxiliary PC.

| Byte | Description | Value |
|---|---|---|
| 0 | Header | 0 × 01 |
| 1 | Packet Length | 5 + (length of text) |
| 2 | Display Update | 0 × 40 |
| 3 | Row | variable |
| 4 | Column | variable |
| 5 ... | Text | "variable string" |

The Clear Display packet can also be used to clear the entire display, or a single row of the display.

| Byte | Description | Value |
|---|---|---|
| 0 | Header | 0 × 01 |
| 1 | Packet Length | 4 |
| 2 | Clear Display | 0 × 41 |
| 3 | Row | |
| | All rows | 0 |
| | Single row | row number |

Messages from the Phone

All messages originating from the PBX 12 have a header value of 0x02.

Button Status (Generic)

The virtual phone 20 is configured with a set of generic buttons used across all switches. These buttons (and associated lamps, if any), have fixed identifiers. Only the buttons with identifiers assigned to the virtual phone function with this command.

The Button status packets are used to supply button press/release information originating from the adjunct phone to the auxiliary PC.

| Byte | Description | Value |
|---|---|---|
| 0 | Header | 0 × 02 |
| 1 | Packet Length | 4 |
| 2 | Button Press (Generic) | 0 × 50 |
| 3 | ID | |
| | Hook Switch | 0 (OFF hook) |
| | Hold | 1 |
| | Transfer | 2 |
| | Release | 3 |
| | Key Pad (0–9, *, #) | 4–15 |
| | Prime Line | 16 |
| | Others | 17 |

| Byte | Description | Value |
|---|---|---|
| 0 | Header | 0 × 02 |
| 1 | Packet Length | 4 |
| 2 | Button Press (Generic) | 0 × 51 |
| 3 | ID | |
| | Hook Switch | 0 (ON hook) |
| | Hold | 1 |
| | Transfer | 2 |
| | Release | 3 |
| | Key Pad (0–9, *, #) | 4–15 |
| | Prime Line | 16 |
| | Others | 17 ... |

Button Status (Raw)

All buttons on all phones have a defined raw id. This command is used to transmit this raw id across the interface. Either this command, or the Generic button status command can be used to transmit button state changes.

In the case where buttons have multiple bytes for the ID, the additional bytes are placed at the end of the packet and the length is changed accordingly.

The Button status packets are used to supply button press/release information originating from the adjunct phone to the auxiliary PC.

| Byte | Description | Value |
|---|---|---|
| 0 | Header | 0 × 02 |
| 1 | Packet Length | 3 + # of bytes in raw ID |
| 2 | Button Press (Raw) | 0 × 52 |
| 3 | Raw ID byte #1 | |
| 4 | [Raw ID byte #2] | |

| Byte | Description | Value |
|---|---|---|
| 0 | Header | 0 × 02 |
| 1 | Packet Length | 3 + # of bytes in raw ID |
| 2 | Button Release (Raw) | 0 × 53 |
| 3 | Raw ID byte #1 | |
| 4 | [Raw ID byte #2] | |

Hook Switch Status

The virtual phone contains a single hook switch which represents the state of the physical hook switch on the phone. A packet is sent when the state of the hook switch changes.

| Byte | Description | Value |
|---|---|---|
| 0 | Header | 0 × 02 |
| 1 | Packet Length | 3 |
| 2 | Hook Switch Up | 0 × 54 |
| 0 | Header | 0 × 02 |
| 1 | Packet Length | 3 |
| 2 | Hook Switch Down | 0 × 55 |

Messages from the Auxiliary PC (Host)

All messages originating from the auxiliary PC 16 have a header value of 0x04. In many cases, the host 16 may emulate commands from the switch or the digital telephone. Any of the previously defined packets may be sent from the host. The header signs the virtual phone as to the source of the command so the appropriate action may be taken.

Button Control and Status

The virtual phone 20 is configured with a set of generic buttons used across all switches. These buttons (and associated lamps, if any), have fixed identifiers. Only the buttons with identifiers assigned to the virtual phone function with this command.

The auxiliary PC 16 uses the button control and status packets to transmit button change requests to the virtual phone. The effect of these packets on the virtual phone 20 is the same as if buttons were pressed on the adjunct phone directly. This protocol allows for auxiliary button press/release emulation.

Regardless if button changes originate on the adjunct phone or the auxiliary PC 16, the virtual phone 20 maintains the current button state. Whenever a button state changes, these same packets are used to transmit the new status to the auxiliary PC 16.

System State

When the host system is ready to receive messages from the virtual phone, it sends the enable command. This causes the virtual phone to send all virtual phone changes and system messages to the host via the host interface protocol. When the host is disabled, the virtual phone still maintains the state phone state, it just blocks the information from being transmitted to the host.

| Byte | Description | Value |
|---|---|---|
| 0 | Header | 0 × 04 |
| 1 | Packet Length | 4 |
| 2 | System State | 0 × 90 |
| 3 | Level | |
| | Disabled | 0 |
| | Enabled | 1 |

Pass Through Flags

The host system has the ability to request certain types of messages to be passed or blocked between the switch and the digital telephone. It is the responsibility of the virtual phone to maintain these flags and send only the specified packets between the units.

If the bit in the mask is set, the packet types are passed through. If cleared, they are blocked.

| Byte | Description | Value |
|---|---|---|
| 0 | Header | 0 × 04 |
| 1 | Packet Length | 4 |
| 2 | Hook Switch Up | 0 × 91 |
| 3 | Flags | |
| | Hook Switch from Set | 0 × 01 |
| | Buttons from Set | 0 × 02 |
| | Lamp updates from switch | 0 × 04 |
| | Display from Switch | 0 × 08 |
| | Ringer from Switch | 0 × 10 |

Dial Command

The host can request the virtual phone to dial a given string of digits. The virtual phone implements the button presses/releases and the necessary delays based on the parameters to the dial command. The dial string can contain any of the keypad buttons and the comma. The keypad buttons represent themselves and the commas represents a specified delay.

The digital duration (byte 3) of the command represents the length in milliseconds that the key is to be held down. The inter-digit duration is the length between key presses. The pause duration is the length of the pause (comma) character.

When the virtual phone completes the dialing, it sends a 3 byte version of this packet back to the host with only the header, length, and commands bytes.

| Byte | Description | Value |
|---|---|---|
| 0 | Header | 0 × 04 |
| 1 | Packet Length | 6 + # of digits in dial string |
| 2 | Dial Command | 0 × 93 |
| 3 | Digit Duration | |
| 4 | Inter-Digit duration | |
| 5 | Pause Duration | |
| 6 | Dial string | |

Bearer Channel Direction

Either the abstraction layer or the host system has the ability to direct the voice mux to their desired device. This device is typically either the adjunct digital phone, or an auxiliary unit. The virtual phone maintains the direction of the voice mux. In addition to voice, a number of additional channels can be controlled. This command is used to transfer mux direction status of all the bearer channels.

If the bit in the mask is set, the mux is directed to the auxiliary unit. If cleared, the channel is directed to the adjunct digital telephone.

| Byte | Description | Value |
|---|---|---|
| 0 | Header | 0 × 04 |
| 1 | Packet Length | 4 |
| 2 | Voice Mux | 0 × 93 |
| 3 | Device Mask | |
| | Voice | 0 × 01 |

-continued

| Byte | Description | Value |
|---|---|---|
| | Data | 0 x 02 |
| | Data1 | 0 x 02 |
| | Data2 | 0 x 04 |

Queries

The auxiliary PC 16 can query the virtual phone 20 for current status at any time. This is done by sending a command symmetric to the receive command for each status type. These commands are the same as the receive commands with the exception of the upper most bit of the header byte. When this bit is high, the virtual phone interprets this as a query and automatically responds with the current status.

For example, if the auxiliary PC 16 is requesting the ringer status, it sends the packet [81 04 20##] (where ## is irrelevant data). The virtual phone 20 will respond by transmitting [01 04 20##] or [01 04 21] (where ## is valid data) back to the auxiliary PC.

The valid query command IDs are:

0x54 Query Hook Switch Status
0x91 Query Pass Through Flags Status
0xB0 Query Switch Carrier Status
0xB1 Query Digital Phone Carrier Status
0x10 Query Voice Status
0x20 Query Ringer Status
0x30 Query Lamp Status
0x40 Query Display Status
0x50 Query Button Status
0xF0 Query Switch Type
0xF1 Query Adjunct Phone Type
0xF2 Query Current Active Phone
0xF3 Query Last Touched Phone In connection with the foregoing description, Table I lists the data structures of virtual phone 20 and Table II lists various serial commands.

TABLE I

Virtual Phone Structures

| | |
|---|---|
| typedef struct | /*Virtual Phone Voice Structure*/ |
| { | |
| BYTE active; | /*1 = active 0 = not active*/ |
| BYTE unit; | /*mask active unit UPV_???? */ |
| BYTE volume; | /*voice mute, low, high, etc */ |
| {VP_VOICE; | |
| typedef struct | /*Virtual Phone Ringer Structure*/ |
| BYTE active; | /*1-active0-not active*/ |
| BYTE cadence; | /*list of current cadence type*/ |
| BYTE tone; | /*list of current tone type*/ |
| {VP_RINGER; | |
| typedef struct | /*virtual phone display structure*/ |
| BYTE row; | /*Current row for this cursor*/ |
| BYTE col; | /*Current column for this cursor*/ |
| }VP_CURSOR: | |
| typedef struct | /*Virtual Phone Display Structure*/ |
| {VP_CURSOR; | |
| typedef struct | /*Virtual Phone Display Structure*/ |
| BYTE grid [VPD_MAX ROWS] [VPD_MAXCOLS]; | /*The display text*/ |
| BYTE cursor {VPD_MAXROWS}; | /*current cursors*/ |
| BYTE NumRows; | /*Number of Rows on this page*/ |
| BYTE NumColumns; | /*Number of Columns on this page*/ |
| BYTE NumCursors; | /*Number of available cursors*/ |
| BYTE IsStable; | /*True if the display has stablized*/ |
| BYTE IsClear; | /*True if the display is currently clear*/ |
| {VP_DISPLAY; | |
| typedef struct | /*Virtual Phone Button/Lamp Structure*/ |
| BYTE deviceMask; | /*mask showing which of next 4 are valid*/ |
| BYTE pressID; | /*ID of button press info*/ |
| BYTE releaseID; | /*ID of button release info*/ |
| BYTE lamp1ID; | /*ID of first lamp info*/ |
| BYTE lamp2ID; | /*ID of second lamp info*/ |
| BYTE buttonState; | /*state of button; 1 = down 0-up*/ |
| BYTE lamp1State; | /*state of first lamp*/ |
| BYTE lamp2State; | /*state of second lamp*/ |
| {VP_BUTTON; | |
| typedef struct | /*Main Virtual Phone Structure*/ |
| { | |
| VP_VOICE voice; | /*voice status*/ |
| VP_RINGER ringer; | /*ringer status*/ |
| VP_DISPLAY display; | /*LCD display status*/ |
| BYTE Hook Switch | /*Hook switch status*/ |
| BYTE num_buttons; | /*number of buttons actually in use*/ |
| VP_BUTTON button [VP_MAXBUTS]; | /*button/lamp status*/ |
| BYTE StandAlone; | /*Operate without Digital set*/ |
| BYTE SwitchType; | /*Type of switch connected*/ |
| BYTE DigSetType; | /*Type of configured digital SET, if any |
| BYTE Connections; | /*Which Phone Units are physically connected*/ |
| BYTE ActivePhone; | /*Which Physical Phone Unit is active |
| BYTE TouchedPhone; | /*Which Physical Phone Unit was touched |
| BYTE Carrier(2); | /*0 = switch 1 = digital set*/ |
| BYTE PassThroughFlags; | /*event block flags*/ |
| BYTE VoiceMux; | /*Bearer channel direction*/ |
| {VIRTUAL_PHONE; | |

TABLE II

Brief Host Command List

| Description | Header | Length | Command | Data1 | Data2 | Data3 |
|---|---|---|---|---|---|---|
| Voice Enable | P | 05 | 10 | Unit | | |
| Voice Disable | P | 03 | 11 | | | Volume |
| Voice State | P | 05 | 12 | Unit | | Volume |
| Ringer Enable | P | 05 | 20 | Cadence | Tone | |

TABLE II-continued

Brief Host Command List

| Description | Header | Length | Command | Data1 | Data2 | Data3 |
|---|---|---|---|---|---|---|
| Ringer Disable | P | 03 | 21 | | | |
| Lamp (Generic) | P | 05 | 30 | status | | |
| Lamp (Raw) | P | 04 + count | 31 | status | 41 ID #1 | [raw ID#2] |
| Display | P | 05 + txt len | 40 | row | col | text . . . |
| Display Clear | P | 03 | 41 | | | |
| Button Press (Gen) | SHX | 04 | 50 | | | |
| Button Release (Gen) | SHX | SHX | 04 | 51ID | | |
| Button Press (Raw) | SHX | 03 + count | 52 | raw ID #1 | [raw ID #2 . . . ] | |
| Button Release (Raw) | | SHX | 03 + count | 53 raw ID #1 | [raw ID #2] | |
| Hook Switch Up | SHX | 03 | 54 | | | |
| Hook Switch Down | SHX | 03 | 55 | | | |
| System State | HX | 04 | 90 | Level | | |
| Pass Through Flags | HX | 04 | 91 | Flags | | |
| Dial Command | HX | 09 = dig its | 92 | see note 1 | | |
| Bearer Channel Ctl | HX | 04 | 93 | Device mask | | |
| Carrier state - PBX | X | 04 | B0 | Level | | |
| Carrier State - SET | X | 04 | B1 | Level | | |
| PBX type | X | 04 | F0 | type | | |
| SET type | X | 04 | F1 | type | | |
| Active Phone | X | 04 | F2 | unit | | |
| Touched Phone | X | 04 | F3 | unit | | |
| Physical Cncts | X | 04 | F4 | mask | | |

Figure 5:
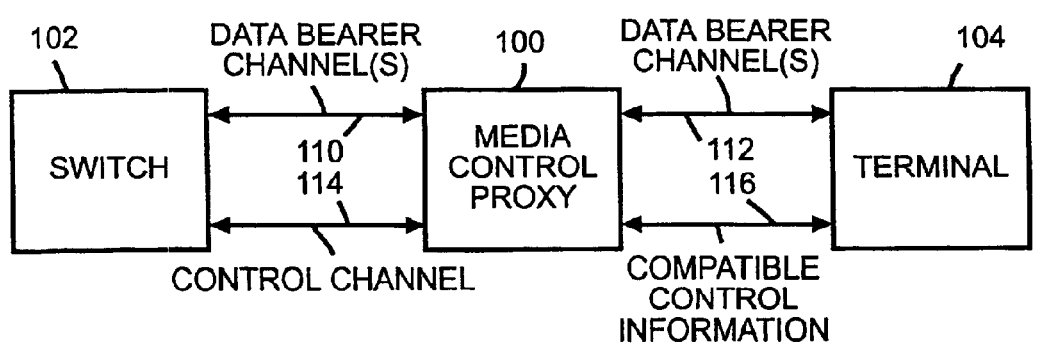
FIG. 5 is a block diagram illustrating a generalized form of the system of FIG. 1.

P-PPBX generated message
S-SET generated message
H-Host generated message
X-Firmware system generated message
note 1: parameters for dial command
data1: digit duration (high byte)
data2: digit duration (low byte)
data3: inter-digit duration (high byte)
data4: inter-digit curation (low byte)
data5: pause duration (high byte)
data6: pause duration (low byte)
data7: ? dial string The system of the present invention can be generalized in the form of the system of FIG. 5 including media control proxy 100, communication switch 102 and communication device or terminal 104. Switch 102 is analogous to PBX 12 in FIG. 1, terminal 104 is analogous to phone 14 in FIG. 1 and media control proxy 100 is a generalized form of the virtual phone 18 of FIG. 1. The Media Control Proxy (MCP) 100 is used as a gateway between some communications switching system, i.e. switch 102, and some terminal, i.e. terminal 104. The main purpose of the MCP is to bridge any gap in the communication protocols between the server device (the switch) 102 and the client (the terminal 104).

Communication device 104 is any device which originates and/or receives a media including audio and visual, and device 104 can be a physical terminal or an emulation of a physical terminal in computer hardware including an application residing in a system.

In the minimum configuration of FIG. 5, the MCP 100 resides between the switch 102 and the terminal 104. Bearer channel data (voice, video, etc) is passed through by the MCP 100 on channels 110 and 112. The information on the control channels 114 and 116 is processed and converted to a protocol understood by the terminal 104. Depending on the type of terminal connected, this could be a proprietary protocol specific to the terminal, or it could be the MCP's standard protocol designed to communicate with a wide range of devices. Control channel 116 also may be viewed as an application program interface (API).

The MCP 100 interprets the information it receives from the control channel 114 of the switch 102 and maintains the state of the terminal 104 as defined by the switch 102. As far as the switch 102 is concerned, the MCP 100 is the terminal 104. The MCP 100 also transmits data on the control channel 114 to the switch 102. It does this in the protocols native to the switch 102. The switch 102 interprets any messages coming from the MCP 100 as those coming from the terminal 104.

The MCP 100 can be configured to function in many different ways. The main point is that it has the ability to communicate with not only the native terminal for the switch, but that it can communicate with an unlimited selection of terminals or communications devices. The fixed (and sometimes proprietary) control protocol used in the original connection between the switch and native terminal is converted to whatever communications method is necessary to support any given terminal.

The type of terminal that may be connected to the MCP 100 is so flexible that the type of medium in which the date and control channels reside is also limitless. A direct proprietary connection is possible, as is a connection over a computer bus. It is also possible to route data and control channel information across new or existing networks. Means of wireless communications is supported. In fact, this system is set up to be configurable to operate with any terminal in whichever transport is desired. The MCP 100 handles the data preparation for any such configuration.

It is therefore apparent that the present invention accomplishes its intended objects. A telephone communication system is provided which converts proprietary PBX or external application protocols into a common format and thus functions as a protocol interpreter between proprietary switching system protocols and the protocols of various applications. The virtual phone generic interface of the present invention is configurable and works independently of a specific type of integration and provides a common interface between any of the digital phone switches and any number of end devices. Changes in the virtual phone interface are communicated to an external processor which, in turn, can command changes in the virtual phone interface.

While an embodiment of the present invention has been described in detail, that is done for purposes of illustration, not limitation.

What is claimed is:

1. In a communication system comprising at least one telephone switch and at least one communication device:
   a virtual phone generic configurable interface between said telephone switch and said communication device to serve as a protocol interpreter of the protocol of said telephone switch and to convert the protocol of said telephone switch and the protocols of applications associated with the operation of said switch and said communication device into a common protocol format to enable communication between said switch and said communication device.

2. A system according to claim 1, wherein said means for providing a virtual phone generic configurable interface includes a set of virtual phone data structures to represent the state of a phone as known to the telephone switch at any given time.

3. A system according to claim 1, wherein said virtual phone generic configurable interface includes a component to provide a virtual phone application program interface for providing data communication between said telephone switch and said communication device.

4. A system according to claim 1, wherein said virtual phone generic configurable interface includes a component to provide a communications protocol for the transfer of phone control information between said telephone switch and said communication device.

5. A system according to claim 1, wherein said means for providing a virtual phone generic configurable interface comprises:
   a) a set of virtual phone data structures to represent the state of a phone as known to the telephone switch at any given time; and
   b) a program interface to access said data structures.

6. A system according to claim 5, wherein said program interface to access said data structures comprises a virtual phone application program interface to provide data communication between said set of virtual phone data structures and said switch and said communication device.

7. In a telephone communication system comprising at least one telephone switch, at least one telephone and a computer to process applications related to the operation of said telephone switch and said telephone:
   a virtual phone generic configurable interface to serve as a protocol interpreter between protocols of said telephone switch and protocols of said applications to convert the protocols of said telephone switch and the protocols of said applications into a common protocol format to enable communication between said telephone switch and said telephone.

8. A system according to claim 7, wherein said virtual phone generic interface comprises:
   a) a set of virtual phone data structures to represent the state of a phone as known to the telephone switch at any given time; and
   b) a program interface to access said data structures; and
   c) a protocol to establish communication between said computer and said data structures.

9. A system according to claim 8, wherein said program interface to access said data structures comprises:
   a) an internal virtual phone application program interface to provide data communication between said set of virtual phone data structures and said telephone switch and said telephone; and
   b) an external virtual phone application program interface to provide data communication between said set of virtual phone data structures and said computer.

10. A system according to claim 9, further including a communications protocol to provide communication between said external virtual phone application program interface and said computer.

11. A method for providing communication in a system comprising at least one telephone switch and at least one communication device, said method comprising:
   a) providing a virtual phone generic configurable interface to serve as a protocol interpreter of the protocol of said telephone switch; and
   b) utilizing said virtual phone generic configurable interface to convert the protocol of said telephone switch and the protocols of applications associated with the operation of said telephone switch and said communication device into a common protocol format to enable communication between said telephone switch and said communication switch.

12. A method according to claim 11, wherein said providing a virtual phone generic configurable interface comprises providing a set of virtual phone data structures for representing the state of a phone as known to the telephone switch at any given time.

13. A method according to claim 11, wherein said providing a virtual telephone generic configurable interface comprises providing a virtual phone application program interface for providing data communication between said telephone switch and said communication device.

14. A method according to claim 11, wherein said providing a virtual phone generic configurable interface comprises:
   a) providing a set of virtual phone data structures for representing the state of a phone as known to the telephone switch at any given time; and
   b) providing a program interface for accessing said structures.

15. A method according to claim 14, wherein said providing a program interface for accessing said data structures comprises providing a virtual phone application program interface for providing data communication between said set of virtual phone data structures and said switch and said communication device.

16. In a communication system comprising at least one communication switch and at least one communication device:
   a media control proxy to serve as a gateway between said communication switch and said communication device to bridge any gap in communication protocols between said communication switch and said communication device and to convert said communication protocols to a common protocol format to enable communication between said communication switch and said communication device.

17. A system according to claim 16, wherein said media control proxy includes a component to convert a fixed control protocol of an original connection between said communication switch and said communication device to a communications method for supporting any given communication device.

18. A system according to claim 16, wherein a first data bearer channel and a first control channel each are connected to said communication switch and to said media control proxy and a second data bearer channel and a second control channel are connected to said media control proxy and to said communication device.

19. A system according to claim 18, wherein said media control proxy includes a component to pass through data on said first and second data bearer channels.

20. A system according to claim 18, wherein said media control proxy includes a processor to process information on said first and second control channels for conversion to a protocol understood by said communications device.

21. A method for providing communication in a system comprising at least one communication switch and at least one communication device, said method comprising:
   a) providing a media control proxy to serve as a gateway between said communication switch and said communication device to bridge any gap in communication protocols between said communication switch and said communication device and to convert said communication protocols to a common protocol format; and
   b) utilizing said media control proxy to enable communication between said communication switch and said communication device.

22. A method according to claim 21, wherein said providing a media control proxy comprises connecting a fixed control protocol of an original connection between said communication switch and said communication device to a communications method for supporting any given communication device.

23. A method according to claim 21, wherein said providing a media control proxy comprises passing through bearer channel data between said communication switch and said communication device.

24. A method according to claim 21, wherein said providing a media control proxy comprises processing control information from said communication switch for conversion to a protocol understood by said communication device.

25. A method according to claim 21, wherein said providing a media control proxy comprises interpreting control information received from said communication switch and maintaining the state of the communication device as defined by the communication switch.

26. A method according to claim 21, wherein said providing a media control proxy comprises transmitting data to said communication switch on a control channel between said media control proxy and said communication switch in a protocol native to said communication switch so that said communication switch interprets a message from said media control proxy as a message from said communication device.

* * * * *